Figure 1:
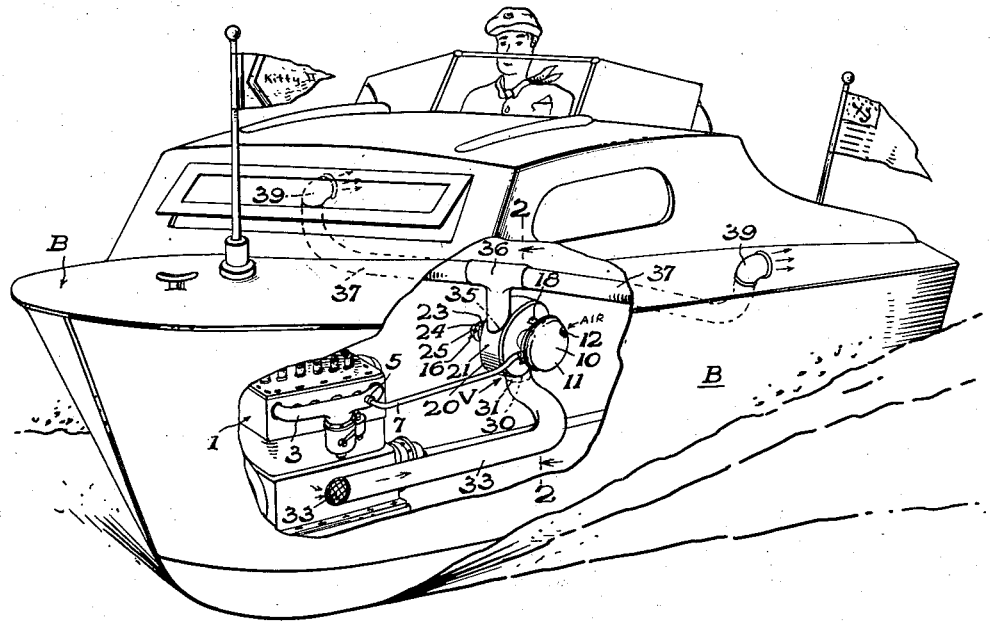

Nov. 6, 1951  E. A. ROPER  2,573,986

VENTILATOR FOR WATER CRAFT

Filed Aug. 30, 1950

INVENTOR
*Edwin A. Roper.*

BY *H. S. Lombard*

ATTORNEY

Patented Nov. 6, 1951

2,573,986

UNITED STATES PATENT OFFICE 2,573,986

VENTILATOR FOR WATER CRAFT

Edwin A. Roper, Washington, D. C.

Application August 30, 1950, Serial No. 182,315

1 Claim. (Cl. 98—43)

This invention relates, in general, to ventilators for water craft, and deals, more particularly, with an improved, simplified construction and arrangement for a ventilator for motor boats or small vessels propelled by an internal combustion engine.

In a motor boat provided with an internal combustion engine, it is the usual practice to provide the engine compartment with a ventilator comprising an electrically driven fan, or the like, operated from the storage battery in the motor boat. The operation of such an electrically driven ventilator causes a considerable drain on the storage battery and necessarily dissipates much energy which could be used for operating other electrical equipment in the motor boat. Moreover, the operation of such electrically driven ventilators over an extended period necessarily results in the need for recharging or replacement of the storage battery all too frequently.

In accordance with the present invention, a fully equivalent ventilator is operated in the same general location in the motor boat but entirely independently of the storage battery in an improved arrangement in which the ventilator is driven by power obtained in the normal operation of the internal combustion engine of the motor boat, thereby conserving the energy of the storage battery and adapting the same for a much longer period of service before recharging or replacement of the storage battery becomes necessary.

A primary object of this invention, therefore, is to provide a ventilator for motor boats and the like, as aforesaid, in which the ventilator is operated from power derived from the normal operation of the internal combustion engine of the motor boat, such as the power provided by the suction created by air or gases passing through the intake manifold of the internal combustion engine.

A further object of the invention is to provide a ventilator of this character, for motor boats and the like, which comprises a suction or air motor that is driven by power derived from the normal operation of the internal combustion engine of the motor boat.

Another object of the invention is to provide a ventilator for motor boats, and the like, which comprises a suction or air motor operated by power obtained from the internal combustion engine of the motor boat, as aforesaid, and a blower or fan which is driven by said air motor.

A further, more specific object of the invention is to provide a ventilator for motor boats, and the like, in the nature of an attachment adapted to be installed in the existing structure of a motor boat and which comprises a compact unitary assembly of a suction motor and a blower or fan driven by the suction motor, with said motor being operated by the suction produced by the air or gases passing through the intake manifold of the internal combustion engine of the motor boat.

Figure 2:
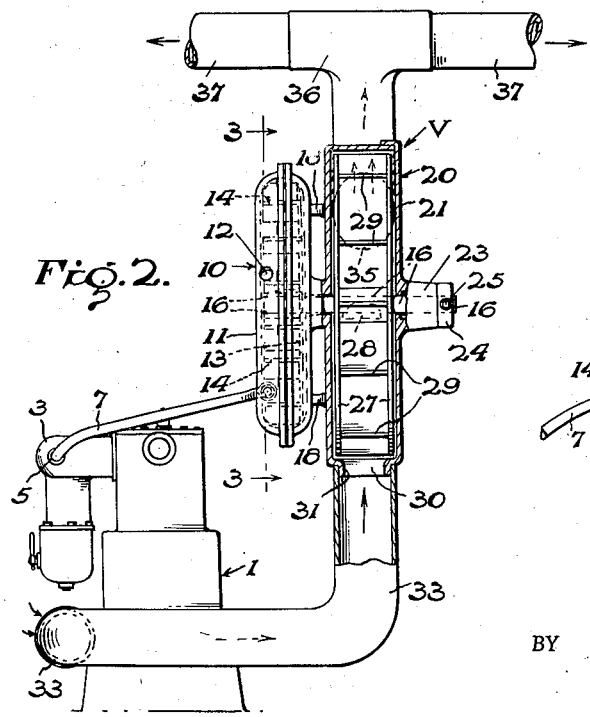
Figure 3:
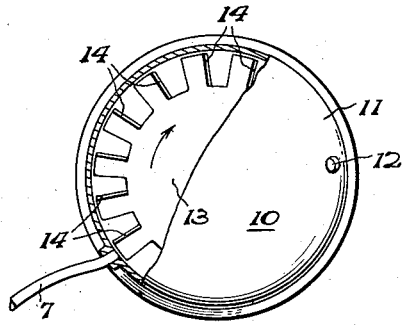

Further objects and advantages, and other new and useful features in the construction, arrangement and general combination of parts of the invention will be readily apparent as the following description proceeds with reference to the accompanying drawings, for purposes of illustration but not of limitation, in which like reference characters designate like parts throughout, and in which:

Figure 1 is a perspective view of a motor boat, or the like, showing an example of an installation of a ventilator in accordance with the invention as provided in connection with the internal combustion engine of the motor boat;

Figure 2 is a view along 2—2 of Figure 1, looking in the direction of the arrows, and shows in elevation the suction motor of the ventilator as connected with the internal combustion engine of the motor boat and adapted to drive the associated blower or fan, shown partly in section; and, Figure 3 is a view along line 3—3 of Figure 2 showing the suction motor partly in elevation and partly in section.

The invention is illustrated and described with reference to the preferred use thereof as a ventilator for the engine compartment of a motor boat for drawing off and disposing of the gasoline fumes, impure air and noxious gases which develop in the operation of the internal combustion engine of the motor boat. The ventilator is provided in direct connection with the internal combustion engine of the motor boat in a manner whereby the ventilator is adapted to operate whenever the engine is running to keep the engine compartment clear of gasoline fumes which otherwise might accumulate and develop into a fire hazard or possible danger of explosion.

Referring now, more particularly, to the drawings, the example of the motor boat B, Figure 1, is shown comprising a conventional internal combustion engine I provided with an intake manifold 3. The manifold 3 is readily provided with a suitable nipple 5 by a simple drilling and tapping operation and said nipple 5 threaded into the tapped hole thus provided. A suction tube 7 has one end secured to the manifold 3 by the nipple 5 and has its other end connected to the ventilator V, so that the suction of the air or gases passing through said manifold 3 operates the ventilator whenever said engine 1 of the motor boat is running.

The ventilator V is mounted in the motor boat in any suitable way and comprises, in general, a suction or air motor 10, connected to the suction tube 7, and driven by the suction of air through said tube 7, as aforesaid, and with said suction motor 10, in turn, driving a blower or fan 20 that operates to draw off the gasoline fumes and noxious gases in the engine compartment of the motor boat, as presently to be described.

The suction motor 10 may be of any suitable type and, in the present example, is shown comprising a generally circular casing 11, provided with a port or passage 12 through which atmospheric air passes into the casing 11 to drive a rotor or bladed wheel 13 rotatably mounted in said casing 11. The bladed wheel or rotor 13 is fixedly mounted, in any suitable way, on one end of a shaft 16 extending transversely through said casing 11. In the present example, such a rotor or bladed wheel 13 is shown provided by a simple circular disc in a highly simplified and inexpensive design wherein the disc is suitably stamped or otherwise formed around its periphery to define a series of blades 14 which are bent outwardly in normal relation to the body of the disc and substantially radially thereof so that air directed against these blades 14 will effect a rotation or turning of said wheel or rotor 13. The arangement, accordingly, is such that under the suction of air through the suction pipe 7 connected to the casing 11, atmospheric air will pass through the air passage 12 in said casing 11 and impinge against said blades 14 more or less tangentially in a manner whereby said rotor or bladed wheel 13 is caused to rotate at relatively high speed in a clockwise direction as indicated by the arrow in Figure 3.

The suction motor 10 is suitably mounted in association with the blower or fan 20 as by studs 18 connecting the casing 11 thereof with the housing 21 of the blower or fan. In this relation, an extension of the shaft 16 extends through the housing 21 of the blower or fan and is journalled in suitable bearings at opposite sides thereof including, preferably, a sleeve bearing 23 at the outer side of said housing 21. The extremity of the shaft 16 projects beyond the sleeve bearing 23 and is secured in the assembly by a collar 24 which is fixedly connected to the projecting end of said shaft 16 by a set screw 25.

The blower or fan mechanism within the housing 21, Figure 2, likewise, may be of any suitable character and, in the present example, is shown provided by a pair of spaced discs or wheel members 27 secured to the associated shaft portion 16 in any suitable way, as by a spline 28, Figure 2. The spaced wheel members 27 are joined together by a series of intermediate radially spaced vanes 29 which define a series of cup-shaped scoops or compartments around the periphery of the blower wheel thus provided.

The blower housing 21 is provided with an inlet opening 30 in the lower portion thereof which is formed preferably with an annular flange 31 that is telescoped within the end of an intake pipe 33 to connect said intake pipe 33 to the blower housing 21. The intake pipe 33 is arranged to extend toward the engine 1 with the open end thereof located in the most effective location for drawing off, under the suction force of the blower 20, any gasoline fumes or noxious gases which are produced in the operation of said engine.

The blower housing otherwise includes an outlet opening 35, designated in dotted lines in Figure 2, which is located in the forward upper portion of the blower housing 21, as seen in Figure 1. The outlet opening 35 is provided with a suitable pipe coupling 36 connected to one or more exhaust pipes 37, for discharging the drawn off gasoline fumes, noxious gases, and impure air to the atmosphere in the most effective manner. In the present example, there is employed for this purpose, a T-shaped pipe coupling 36, in communication with the outlet opening 35 of the blower and with the arms of said coupling connected to exhaust pipes 37 extending toward the opposite sides of the boat and terminating in exhaust funnels 39.

With the improved ventilator of the invention installed in a motor boat, or the like, substantially as described, it will be understood that whenever the engine 1 is running, the usual suction developed by the mixture of fuel and air passing through the intake manifold 3 provides a proportionate suction through the suction tube 7 connected to said manifold by the nipple 5. The force of such suction through said tube 7 is transmitted to the suction motor 10 connected to the other end of said tube 7, and this causes atmospheric air to be drawn through the passage 12 in the motor casing 11 and to impinge upon the blades 14 of the rotor 13 to rotate the same at relatively high speed in a clockwise direction, as indicated by the arrow in Figure 3. This rotation of the rotor 13 causes a corresponding rotation of the shaft 16 on which it is mounted, and said shaft 16, in turn, rotates the blower wheel or fan 27 of the blower 20.

The rotation of the blower wheel 27 creates a strong draft or suction through the inlet opening 30 in the blower housing 21 connected to the intake pipe 33. As a result of such suction through the intake pipe 33, gasoline fumes, noxious gases, and impure air in the area of the engine 1 are drawn into the open end of the intake pipe 33 and pass into the blower housing 21. The scoops provided by the vanes 29 on the rotating blower wheel 27 thereupon direct such gasoline fumes, noxious gases and impure air under high force through the outlet opening 35 in the blower housing 21 and through the T-coupling 36 to the exhaust pipes 37 and exhaust funnels 39.

An important advantage of the ventilator of the present invention resides in the fact that it is readily provided at relatively low cost as a simple, compact and inexpensive attachment which may be installed in a motor boat and similar water craft with little change or modification in the existing structure of the motor boat.

It will also be appreciated that while the present disclosure is directed primarily to the ventilation of the engine-containing compartment of a motor boat, the invention may also be employed in a similar manner for ventilating other compartments such as the kitchen compartment or rest room in a motor boat, or the like, equipped with such facilities.

While the invention has been described in detail with a specific example, such example is intended as an illustration only inasmuch as it will be apparent that various modifications in the construction, arrangement and general combination of parts of the invention may be provided without departing from the spirit and scope of the invention. The present embodiment is therefore to be considered in all respects as illustrative and not restrictive, the scope of the invention being indicated by the appended claim rather than by the foregoing description, with all changes falling within the scope, meaning, and range of equivalency of the claim intended to be embraced therein.

What is claimed and desired to be secured by United States Letters Patent is:

A ventilator for water craft containing an internal combustion engine including an intake manifold, said ventilator comprising a shaft, a suction motor mounted on said shaft and adapted to rotate said shaft, a blower mounted on said shaft and driven by the rotation of said shaft, a tube extending from said suction motor for connecting said suction motor to said intake manifold whereby the suction through said manifold in the operation of said internal combustion engine creates suction through said tube to drive said suction motor, an intake pipe connected to said blower and adapted to extend into the bilge area of the water craft to draw off gasoline fumes and the like produced in the operation of the internal combustion engine, and an exhaust pipe connected to said blower adapted to discharge such fumes to the atmosphere under force of said blower.

EDWIN A. ROPER.

REFERENCES CITED

The following references are of record in the file of this patent:

UNITED STATES PATENTS

| Number | Name | Date |
|---|---|---|
| 1,586,688 | Morgan | June 1, 1926 |
| 1,679,678 | Mulder et al. | Aug. 7, 1928 |
| 1,922,070 | Anderson | Aug. 15, 1933 |
| 2,072,744 | Findley | Mar. 2, 1937 |
| 2,100,281 | Hueber et al. | Nov. 23, 1937 |
| 2,158,380 | Priess | May 16, 1939 |